(12) United States Patent
Sankararaman et al.

(10) Patent No.: US 11,917,029 B1
(45) Date of Patent: Feb. 27, 2024

(54) SYSTEM AND METHOD FOR FEATURE AGGREGATION FOR TRACKING ANONYMOUS VISITORS

(71) Applicant: Intuit Inc., Mountain View, CA (US)

(72) Inventors: Shankar Sankararaman, Burlingame, CA (US); Pragya Tripathi, Oakland, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/193,547

(22) Filed: Mar. 30, 2023

(51) Int. Cl.
*G06F 15/173* (2006.01)
*H04L 67/50* (2022.01)
*H04L 67/306* (2022.01)

(52) U.S. Cl.
CPC .......... *H04L 67/535* (2022.05); *H04L 67/306* (2013.01)

(58) Field of Classification Search
CPC ............................ H04L 67/535; H04L 67/306
USPC ........................................................ 709/224
See application file for complete search history.

(56) References Cited

U.S. PATENT DOCUMENTS

| | | | | |
|---|---|---|---|---|
| 2012/0303552 | A1* | 11/2012 | Zayas | G06Q 30/00 709/224 |
| 2014/0075014 | A1* | 3/2014 | Chourey | G06Q 30/02 709/224 |
| 2014/0143655 | A1* | 5/2014 | Alon | G06N 7/01 715/234 |
| 2017/0286558 | A1* | 10/2017 | Kelleher | G06F 11/323 |
| 2018/0107752 | A1* | 4/2018 | Elez | G06F 16/2379 |
| 2019/0289085 | A1* | 9/2019 | Miller | H04W 4/14 |

OTHER PUBLICATIONS

Vassilis Christophides, End-to-End Entity Resolution for Big Data: A Survey. ACM Computing Surveys, vol. 53, No. 6, Article 127, Dec. 202, 42 pages. https://doi.org/10.1145/3418896.
Hanna Kopcke, Evaluation of Entity Resolution Approaches on Real-World Match Problems, Sep. 1, 2010, 10 pages, https://dl.acm.org/doi/10.14778/1920841.1920904.
Josephine Liu, Identity Resolution: The Definitive Guide, Mar. 12, 2020, 12 pages, https://segment.com/blog/identity-resolution/.
Nils Barlaug, Neural Networks for Entity Matching: A Survey, ACM Trans. Knowl. Discov. Data. 15,3 (Apr. 2021), 36 pages, https://doi.org/10.1145/3442200.

* cited by examiner

*Primary Examiner* — Alan S Chou
(74) *Attorney, Agent, or Firm* — Paradice & Li LLP (57) ABSTRACT

Systems and methods for tracking anonymous visitors of an online website or mobile app are disclosed. The browsing activity by an anonymous visitor of the online website or mobile app is converted into features and a visitor-identifier associated with the browsing activity generated by the anonymous visitor is determined. The features are stored with the visitor-identifier in a super-visitor-state before the visitor-identifier is associated with a super-visitor-identifier. After the visitor-identifier is associated with the super-visitor-identifier, the features are stored with the super-visitor-identifier in the super-visitor-state. After the visitor-identifier is associated with the super-visitor-identifier, the features associated with the visitor-identifier in the super-visitor-state may be combined, e.g., aggregated, with the features associated with the super-visitor-identifier and the visitor-identifier may be removed from the super-visitor-state.

18 Claims, 7 Drawing Sheets

SYSTEM AND METHOD FOR FEATURE AGGREGATION FOR TRACKING ANONYMOUS VISITORS

BACKGROUND

Online tracking of users is useful for many reasons, such as improving customer engagement and user experience. For example, by tracking visitors to a website or mobile app, appropriate recommendations and experiences (which may include personalized messaging through text or images or a combination of thereof) for each visitor may be provided. Online tracking of visitors typically relies on identification of the user, e.g., based on a well-defined Customer Data Platform (CDP) that contains information about users. For example, websites that perform matching services, e.g., matching a user with a driver or delivery person, have access to the user data because these models are employed only after users have logged in to the respective websites. Systems that recommend content to users similarly rely on user's information after the user has been authenticated into the system. E-commerce websites also rely on information after users have logged into the system. Prior to logging in or authentication of the system, user information and identification is not available, i.e., the user is anonymous, and consequently, the power of models cannot be fully utilized.

A website may attempt to track an anonymous visitor using an identifier, referred to as a visitor-ID. The website, for example, may track the behavior of each anonymous visitor and develop visitor-ID level features that may be used in marketing models. For example, a website may track a visitor's information using cookies that are added to the visitor's browser. Due to restrictions on third party cookies, however, a visitor may be assigned multiple visitor-identifiers. Additionally, a visitor may access a website anonymously using multiple devices. For example, a visitor may access a particular website anonymously at different times using a personal laptop, a mobile phone, a tablet, and a work computer. The customer, accordingly, will be assigned a different visitor-ID for each anonymous access to the website via a different device. Accordingly, a website may track the same customer using multiple identifiers.

It is desirable to aggregate features from multiple visitor-IDs for a single customer in order to better train models and improve predictions and to provide a better user experience, e.g., consistent set of experiences, for a customer across multiple visits to a website via different devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect described in this disclosure can be implemented as a computer-implemented method for tracking anonymous visitors of an online website or mobile app. The method includes converting browsing activity by an anonymous visitor of the online website or mobile app into features and determining a visitor-identifier associated with the browsing activity generated by the anonymous visitor. The method also includes storing the features with the visitor-identifier in a super-visitor-state before the visitor-identifier is associated with a super-visitor-identifier, and storing the features with the super-visitor-identifier in the super-visitor-state after the visitor-identifier is associated with the super-visitor-identifier.

Another innovative aspect of the described in this disclosure can be implemented as a system for tracking anonymous visitors of an online website or mobile app. An example system includes one or more processors and a memory storing instructions that, when executed by the one or more processors, cause the system to perform operations. The operations include converting browsing activity by an anonymous visitor of the online website or mobile app into features, and determining a visitor-identifier associated with the browsing activity generated by the anonymous visitor. The operations further include storing the features with the visitor-identifier in a super-visitor-state before the visitor-identifier is associated with a super-visitor-identifier, and storing the features with the super-visitor-identifier in the super-visitor-state after the visitor-identifier is associated with the super-visitor-identifier.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Specific implementations will now be described in detail with reference to the accompanying figures. Like elements in the various figures are denoted by like reference numerals for consistency. In the following detailed description, numerous specific details are set forth in order to provide a more thorough understanding of the present disclosure. However, it will be apparent to one of ordinary skill in the art that aspects of the disclosure may be practiced without these specific details. In other instances, well-known features have not been described in detail to avoid unnecessarily complicating the description.

Before a visitor authenticates into an online website, little information about the visitor is available to the website server. Visitor-level information, however, is useful as it may be used to effectively improve recommendations and experiences, such as links or information displayed, for a visitor of an online website. For example, machine learning models may be used to infer appropriate recommendations for the best actionable next steps and experiences for a visitor based on visitor-level data. Visitor identification, obtained through logging in or authentication with the website or through the use of cookies, is conventionally used for tracking the visitor and providing appropriate recommendations and experiences for each visitor. Visitors to websites, however, may not log in or authenticate, so that the visitor's identity is unknown. Moreover, reliance on cookies to track a user is becoming more problematic due to ever increasing emphasis on privacy and tracking concerns. Accordingly, visitors to online websites may be effectively anonymous to website servers with little information available for inferring recommendations and experiences to the visitor.

A website or app that, for example, sells products and services, may use marketing models for its visitors. Visitors may access the website from multiple devices, e.g., personal computers, mobile phones, tablets, work computers, etc. The website may track different customers or the same customer accessing the website or app via a different device using a different identifier, referred to herein as a visitor-ID. The website can track the behavior of each anonymous visitor, e.g., browsing activity, and develop visitor-ID level features, which may be of any nature, e.g., numerical, categorical, etc., for use in marketing models to infer personalized predictions for recommendations and experiences for each anonymous visitor that may be provided to the anonymous visitor via the online website or app.

Thus, a single customer may be tracked using multiple visitor-IDs. Even though the visitor remains anonymous, it is possible to use some visitor attributes, e.g., cookies, device, IP (internet protocol) address, etc., to associate multiple visitor-IDs with the same customer using known identity resolution techniques, such as COSY, PPJoin+, FellegiSunter, FEBRL (Freely Extensible Biomedical Record Linkage), and MARLIN (Multiply Adaptive Record Linkage with INduction). Identity resolution is sometimes referred to as identity stitching, entity resolution, object matching, duplicate identification, record linkage, reference reconciliation, or the like. An identity resolution algorithm associates multiple visitor-IDs (e.g., for a single customer using different devices to access the website or app) into a unique customer identifier, referred to as a super-visitor-ID.

The features that are generated based on the behavior of an anonymous visitor, e.g., browsing activity, are at the visitor-ID level, not a super-visitor-ID level. It is desirable, however, to aggregate the features at the visitor-ID level in real-time and to use the aggregated features to obtain features at the super-visitor-ID level without duplication. It should be noted that if the visitor logs in, authenticates or otherwise becomes de-anonymized in any form, then resolving duplicate entries and aggregating features becomes straightforward. Due to the anonymous nature of visits, however, websites cannot easily resolve duplicate entries and aggregate features but, instead, apply known identity resolution techniques to associate multiple visitor-ID to a single super-visitor-ID, with both the visitor-IDs and super-visitor-ID remaining anonymous. The use of identity resolution is helpful as it enables aggregation of features from multiple visitor-IDs and calculation of features at a super-visitor-ID level, from which enriched information and increased number of features for a super-visitor-ID can be obtained, thereby leading to better trained models and improved predictions. Additionally, identity resolution is beneficial as it may be used to provide a consistent set of experiences for a given super-visitor-ID across multiple visits and devices, thereby facilitating improved user experience for customers across the website.

While an identity resolution algorithm may associate multiple visitor-IDs with a super-visitor-ID, this process is typically delayed. For example, the identity resolution algorithm is typically run in batches at a predefined frequency, e.g., once a day, once an hour, etc., and is not performed in real-time. Therefore, the identity resolution algorithm will not be applied at the first visit of a customer with a particular device when a visitor-ID is created. Until the identity resolution algorithm is applied, a super-visitor-ID may not be available for a visitor.

Accordingly, one challenge faced by the use of identity resolution algorithms is the delayed availability of the super-visitor-ID. Because the identity resolution algorithm performs the stitching of identifiers for a given visitor only after the first visit, the ability to capture features on the first visit is lost. Features captured from the first visit of a customer and subsequent visits until the next scheduled identity resolution algorithm is run will be lost due to the delayed availability of a super-visitor-ID because there is no process of tracking visitors without a super-visitor-ID. Another challenge faced by identity resolution algorithms is aggregating features in real-time so that marketing models, e.g., machine learning (ML) inference-models, have access to the latest features associated with the visitor-ID or the super-visitor-ID. An additional challenge faced by identity resolution algorithms is cautiously avoiding double counting aggregated values for the super-visitor-ID when the identity resolution algorithm associates a super-visitor-ID with a visitor-ID.

As discussed herein, two data maps stored in a storage system may be maintained, which may be beneficial to resolve the above challenges. The data maps are capable of holding values over time for any standard types, and therefore, supports the tracking of values taken by variables over time and the evolution of values with time. For example, consider the number of clicks on a certain page; until a certain time-instant, if the number of clicks is N, then when additional click is observed in visitor activity, the state of the variable is incremented by 1 and the new value is N+1. The first data map (referred to as visitor-state) is a mapping from the visitor-ID to a feature-vector that contains the values of features, while the second data map (referred to as super-visitor-state) is a mapping from a super-visitor-ID to a feature-vector, which is not available until after the identity resolution algorithm has run and associated visitor-IDs with the super-visitor-ID. Instead of merely tracking super-visitor-IDs in the super-visitor-state and tracking visitor-IDs in the visitor-state, implementations discussed herein track (store) features associated with the visitor-ID in a visitor-state and in the super-visitor-state to resolve the challenge of delayed availability of the super-visitor-ID. The features associated with the visitor-ID in the visitor-state may be used, e.g., for real-time modeling applications until after the identity resolution algorithm has run, and after the super-visitor-ID is available the features associated with the visitor-ID in the super-visitor-state may be tracked (stored) with the super-visitor-ID in the super-visitor-state and used, e.g., for the real-time modeling. Additionally, as discussed herein, a single feature-store may be maintained, which contains features at both the visitor-ID level and the super-visitor-ID level, which may be beneficial to enable model development and deployment at either level. Thus, when a new customer visits a website (or a repeat customer visits the website with a different device), the feature-vector of the super-visitor-ID is constructed in real-time, while writing the results of both the visitor-state as well as super-visitor-state to a feature-store, in order to facilitate use in real-time modeling applications.

In implementations discussed herein, anonymous visitors of an online website or mobile app may be tracked by storing the visitor-ID in the super-visitor-state (in addition to the visitor-state) until the super-visitor-ID is available for tracking. The browsing activity by an anonymous visitor of the online website or mobile app, for example, may be converted into features, and a visitor-identifier associated with the browsing activity generated by the anonymous visitor may be determined. Before the visitor-identifier is associated with a super-visitor-identifier, e.g., by an identity resolution algorithm, the features are stored with the visitor-identifier in a super-visitor-state. Additionally, before the visitor-identifier is associated with a super-visitor-identifier, the features may also be stored with the visitor identifier in a visitor-state, which may be used for real-time modeling applications, if desired. After the visitor-identifier is associated with the super-visitor-identifier, e.g., by the identity resolution algorithm, the features are stored with the super-visitor-identifier in the super-visitor-state. Additionally, the features associated with the visitor-identifier stored in the super-visitor-state may be combined, e.g., aggregated, with the features associated with the super-visitor-identifier and the visitor-identifier may be removed from the super-visitor-state. The features stored with the super-visitor-identifier in the super-visitor-state may then be used for real-time modeling applications, if desired.

Various aspects of the present disclosure provide a unique computing solution to tracking anonymous visitors to online websites or mobile apps. Converting browsing activity of anonymous visitors of the online website or mobile app into features that are stored in a super-visitor-state with a visitor-identifier associated with the browsing activity prior to association of the visitor-identifier with a super-visitor-identifier and which are stored in the super-visitor-state with a super-visitor-identifier associated after to association of the visitor-identifier with the super-visitor-identifier is an improvement to the functionality of the computer system and technological field. The efficiency of the computer system, for example, is improved by tracking the features before the super-visitor-ID is found, thereby avoiding the loss of information. The features associated with the visitor-ID, for example, are tracked in the super-visitor-state thereby compensating for the delayed availability of the super-visitor-ID found currently found in the technological field. Moreover, the features associated the visitor-ID stored in the super-visitor-state may be efficiently combined with features associated with the super-visitor-identifier and the visitor-ID removed from the super-visitor-state, once the super-visitor-identifier becomes available, thereby improving operation of the computer system by avoiding the loss of data that commonly occurs in the current technological field. Moreover, storing features associated with the visitor-ID in the super-visitor-state, is more memory efficient, as less memory is used to track both visitor and super-visitor level information. In addition, such processes performed by the computer system as described herein cannot be performed in the human mind, much less using pen and paper. As such, implementations of the subject matter disclosed herein are not an abstract idea such as organizing human activity or a mental process that can be performed in the human mind and is integrated into a practical application.

Figure 1:
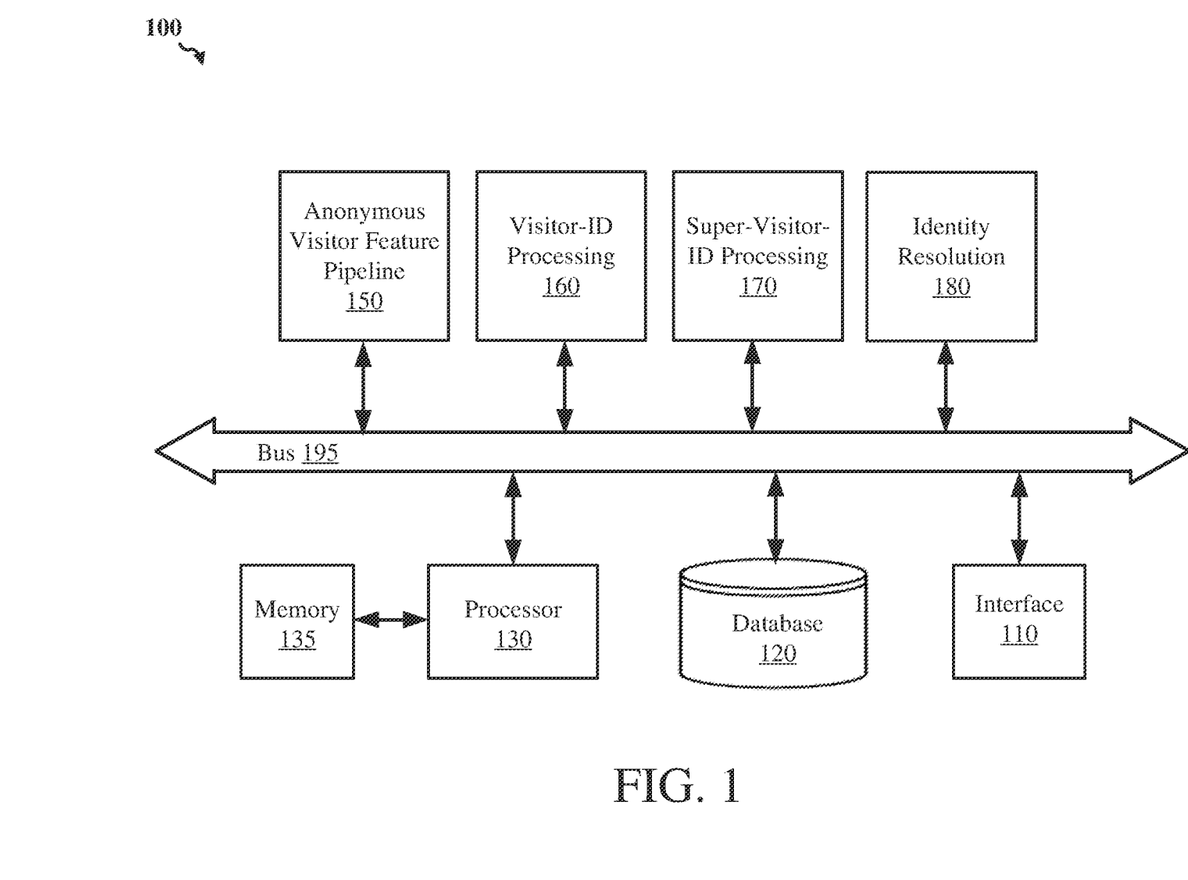
FIG. 1 shows an example computer system that may be used for tracking anonymous visitors of an online website or mobile app, according to some implementations.

FIG. 1 shows an example computer system 100 that may be used for tracking anonymous visitors of an online website or mobile app, according to some implementations. The computer system 100 includes an interface 110, a database 120, a processor 130, a memory 135 coupled to the processor 130, an anonymous visitor feature pipeline 150, a visitor-ID processing module 160, and a super-visitor-ID processing module 170. In some implementations, the computer system 100 may include an identity resolution module 180 or the identity resolution module may be included in another system that is connected to the computer system 100. In some implementations, the various components of the computer system 100 may be interconnected by at least a data bus 195, as depicted in the example of FIG. 1. In other implementations, the various components of the computer system 100 may be interconnected using other suitable signal routing resources. The computer system 100 may be or may be part of or connected to a server that provides access to an online website to users via a network, such as the internet.

The computer system 100 is configured to track anonymous users of an online website (or mobile app) based on browsing activity on a visitor-ID level and a super-visitor-ID level in order to perform identity resolution without loss of state or delay. The features associated with the anonymous user on a visitor-ID level or super-visitor-ID level may be used as input data for a trained machine learning model visitor feature pipeline to infer recommendations and experiences on the online website (or mobile app) for the anonymous users. For example, prior to identity resolution, based on browsing activity, an anonymous user of the online website (or mobile app) may be tracked at the visitor-ID level in the visitor-state, which may be used by the trained ML model to infer personalized recommendations and experiences on the online website (or mobile app) for the anonymous user prior to identity resolution. Additionally, prior to identity resolution, based on browsing activity, an anonymous user of the online website (or mobile app) may be tracked also at the visitor-ID level in the super-visitor-state. Once the super-visitor-ID is available, e.g., after identity resolution, the tracked information for the visitor-ID level in the super-visitor-state is aggregated and associated with the super-visitor-ID which may be used by the trained ML model to infer personalized recommendations and experiences on the online website (or mobile app) for the anonymous user after identity resolution after identity resolution. The browsing activity, for example, may include the pages viewed, icons clicked, the time spent on a page, etc., and the personalized recommendations and experiences may include information displayed, links provided, products offered, etc. While examples in describing operations of the computer system 100 are sometimes related to personalized recommendations and experiences for marketing for clarity in explaining aspects of the present disclosure, the computer system 100 may be configured to infer personalized recommendations and experiences for any desired reasons, including purely informational reasons.

The interface 110 may be one or more input/output (I/O) interfaces to receive or monitor the user's interaction with an online website or mobile app, including the users' browsing activity, such as pages viewed, icons clicked, timestamps of the activity, etc., as well as how the users interact with the website or mobile app, e.g., whether the user clicks on recommended links or other experiences, logs or signs in, purchases products, timestamps for interactions, etc. The interface 110, for example, may be an interface with the website or app server or may be an interface with a network through which users access the computer system 100, e.g., if the computer system 100 is or is part of the website server. Users need not log in or authenticate to interact with online server and are accordingly considered anonymous users. An example interface may include a wired interface or wireless interface to the internet or other means to communicably couple with other devices. For example, the interface 110 may include an interface with an ethernet cable or a wireless interface to a modem, which is used to communicate with an internet service provider (ISP) directing traffic to and from other devices (such as a user's local computer system and computer systems or servers for accessing the publicly available inventories). In some implementations, the interface 110 may further include a display, a speaker, a mouse, a keyboard, or other suitable input or output elements that allow interfacing with administrators.

The database 120 may store data obtained by the interface 110 and determined by the processor 130, the anonymous visitor feature pipeline 150, visitor-ID processing module 160, and super-visitor-ID processing module 170. For example, the database 120 may store anonymous user interactions with the website obtained via the interface 110, such as browsing activity, interactions, and associated timestamps. The database 120 may further store any data generated by the anonymous visitor feature pipeline 150 including the anonymous user identifiers, e.g., visitor-IDs, that are assigned to each anonymous user that is associated with the browsing activity, interactions, and associated timestamps, as well as features generated based on the browsing activity and timestamps. The database 120 stores any data associated with a visitor-state and any data associated with a super-visitor-state, e.g., as generated by the visitor-ID processing module 160 and the super-visitor-ID processing module 170, and as discussed in reference to FIG. 2. The database 120, for example, may store any data generated by the visitor-ID processing module 160, including associations of visitor-IDs and the set of features that are generated based on the interactions with the website or app for each visitor-ID. The database 120 may further store any data generated by the super-visitor-ID processing module 170, including super-visitor-IDs, and the association of visitor-IDs and/or super-visitor-IDs and the set of features that are generated based on the interactions with the website or app for each visitor-ID. In some implementations, the database 120 may store the set of features as a feature value map, which may be associated with the visitor-IDs and/or super-visitor-ID. The features, for example, may be stored as a dictionary that maps the visitor-IDs or super-visitor-ID to the feature values, e.g., a table with the key that is the visitor-ID or the super-visitor-ID. The database 120 may further store parameters for the identity resolution module 180 as well as parameters for a trained ML model. In some implementations, the database 120 may include a relational database capable of presenting information (such as features and visitor-IDs and/or super-visitor-IDs determined by the computer system 100) as data sets in tabular form and capable of manipulating the data sets using relational operators. The database 120 may use Structured Query Language (SQL) for querying and maintaining the database 120.

The processor 130 may include one or more suitable processors capable of executing scripts or instructions of one or more software programs stored in computer system 100 (such as within the memory 135). For example, the processor 130 may be capable of executing one or more applications of the anonymous visitor feature pipeline 150, visitor-ID processing module 160, super-visitor-ID processing module 170, identity resolution module 180, and in some implementations, a ML model and providing or implementing the inferences produced by the ML model for the online website. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processor 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications of the anonymous visitor feature pipeline 150, visitor-ID processing module 160, super-visitor-ID processing module 170, and identity resolution module 180 that may be executed by the processor 130. The memory 135 may also store anonymous user identifiers, browsing activity, interactions, and associated timestamps, as well as visitor-IDs, super-visitor-IDs, and associated features produced by the anonymous visitor feature pipeline 150, visitor-ID processing module 160, and super-visitor-ID processing module 170. In some implementations, hardwired circuitry may be used in place of, or in combination with, software instructions to implement aspects of the disclosure. As such, implementations of the subject matter disclosed herein are not limited to any specific combination of hardware circuitry and/or software.

The computer system 100 uses the anonymous visitor feature pipeline 150 to obtain and convert anonymous visitor-level browsing activity into anonymous visitor-level features continuously. The anonymous visitor feature pipeline 150, for example, may assign an anonymous user identifier (visitor-ID) to each anonymous user, or identify the anonymous user identifier (visitor-ID or super-visitor-ID) for each anonymous user. For example, the anonymous visitor feature pipeline 150 may connect with the identity resolution module 180 to identify if a super-visitor-ID already exists for the anonymous user. The anonymous visitor feature pipeline 150 additionally converts browsing activity associated with each anonymous user identifier into features, e.g., numerical and/or categorical features, that describe, e.g., pages-viewed (including pages that contain help articles, product descriptions, etc.), icons-clicked, time spent, and any other information that indicates the visitor's engagement with the online website. The anonymous visitor feature pipeline 150, for example, calculates visitor-ID features, i.e., a feature vector and stores, e.g., in database 120, this information as a mapping from feature-name to feature-value, for a given visitor-ID. The pipeline may perform real-time clickstream processing to enable real-time computation of the aforementioned features from live data that captures visitors' browsing behavior, which may be stored as a function of time. As a result, features associated with each visitor-ID are continuously available to the visitor- ID processing module 160 and the super-visitor-ID processing module 170, and stored in a dataset, e.g., in the database 120.

The computer system 100 maintains two data maps, referred to as visitor-state and super-visitor-state. The visitor-state stores only feature-vectors at the visitor-ID level. The super-visitor-state stores (i) feature-vectors at a visitor-ID level until a super-visitor-ID is available, and (ii) feature-vectors at a super-visitor-ID level after the corresponding super-visitor-ID is available. Once a super-visitor-ID is available for a visitor-ID, the feature-vectors corresponding to the visitor-ID are removed from the super-visitor-state. With the use of the visitor-state and super-visitor-state as discussed herein, aggregation of features is possible from all visits, even before a super-visitor-ID is available from the identity resolution module 180.

The computer system 100 uses the visitor-ID processing module 160 to aggregate features at the visitor-ID level across multiple visits and to write the result to an online feature-store, e.g., in database 120. The visitor-ID processing module 160, for example, will add a new visitor-ID and associated features to the visitor-state if the visitor-ID does not exist as a key in the visitor-state. If the visitor-ID already exists as a key in the visitor-state, the visitor-ID processing module 160 may add current (new) features associated with the visitor-ID, e.g., by aggregating previous features associated with the visitor-ID with the current features. The feature aggregation may be implemented in the visitor-ID processing module 160 using one or more aggregation mechanisms, such as summation, most recent value, maximum/minimum possible value, etc. For example, a feature that captures the number of views on a certain page may be aggregated using summation, whereas a feature that captures the oldest or most-recent date of activity may be aggregated using maximum/minimum computation.

The computer system 100 uses the super-visitor-ID processing module 170 to aggregate features across multiple visitor-IDs and to write the result to an online feature-store, e.g., in database 120. For example, if the identity resolution module 180 has not associated a visitor-ID to the super-visitor-state, the super-visitor-ID processing module 170, for example, will add a new visitor-ID and associated features to the super-visitor-state, if the visitor-ID does not already exist as a key in the super-visitor-state. If the visitor-ID already exists as a key in the super-visitor-state, the super-visitor-ID processing module 170 may add current (new) features associated with the visitor-ID, e.g., by aggregating previous features associated with the visitor-ID with the current features. If, however, the identity resolution module 180 has already associated a visitor-ID to the super-visitor-state, the super-visitor-ID processing module 170 will add a new super-visitor-ID and associated features to the super-visitor-state, if the super-visitor-ID does not exist as a key in the super-visitor-state. If the super-visitor-ID already exists as a key in the super-visitor-state, the super-visitor-ID processing module 170 may add current (new) features associated with the super-visitor-ID, e.g., by aggregating previous features associated with the super-visitor-ID with the current features. Additionally, if the identity resolution module 180 has already associated a visitor-ID to the super-visitor-state and a visitor-ID is still present in the super-visitor-state, the super-visitor-ID processing module 170 may add the features associated with the visitor-ID to the super-visitor-ID, e.g., by aggregating features associated with the visitor-ID with the features associated with the super-visitor-ID, and may delete the visitor-ID entry from the super-visitor-state. The feature aggregation may be implemented in the super-visitor-ID processing module 170 using one or more aggregation mechanisms, such as summation, most recent value, maximum/minimum possible value, etc. For example, a feature that captures the number of views on a certain page may be aggregated using summation, whereas a feature that captures the oldest or most-recent date of activity may be aggregated using maximum/minimum computation.

The computer system 100 uses the identity resolution module 180 to associates multiple visitor-IDs (e.g., for a single customer) with a super-visitor-ID, e.g., based on visitor attributes, such as cookies, device, IP (internet protocol) address, etc., using known identity resolution techniques, such as COSY, PPJoin+, FellegiSunter, FEBRL, and MARLIN. The identity resolution performed by the identity resolution module 180 may be performed periodically with a desired frequency, e.g., once a day. With the use of the visitor-state and super-visitor-state, as discussed herein, however, aggregation of features is possible from all visits, even before a super-visitor-ID is available from the identity resolution module 180. That is, if a visitor were to visit certain pages and spend time reading product information, then this information is featurized at both the visitor-ID and super-visitor-ID levels immediately and made available to ML powered marketing models for consumption.

Figure 2:
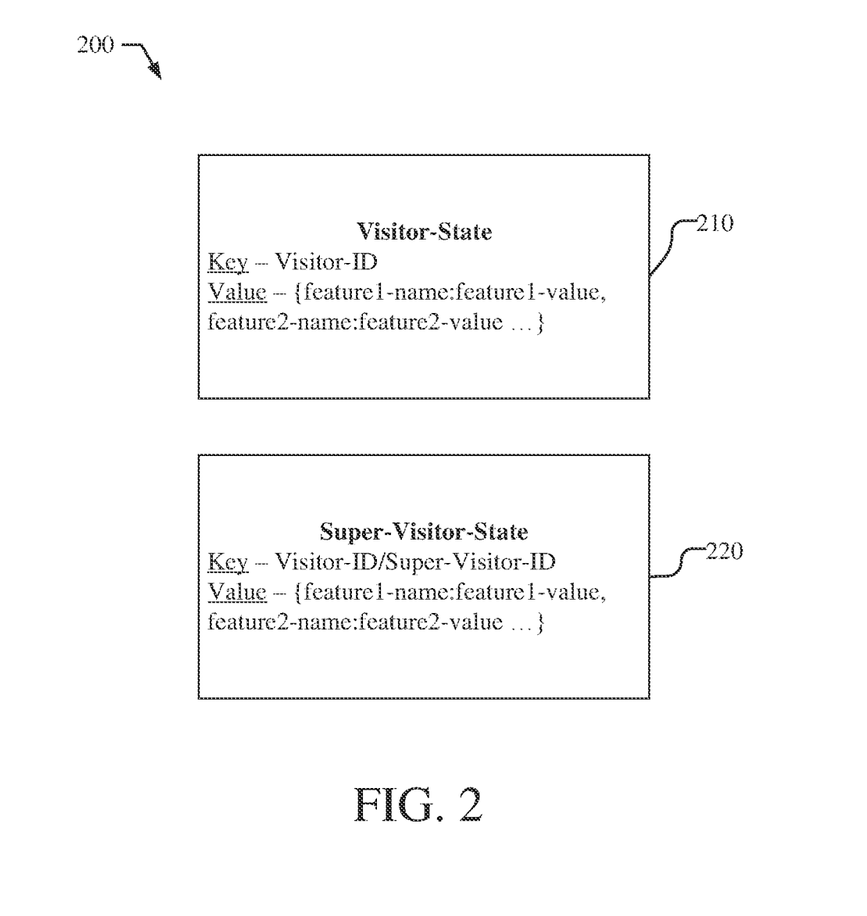
FIG. 2 shows an illustration of data maps maintained by the system, including a visitor-state and a super-visitor-state.

FIG. 2 illustrates the data maps 200 maintained by the computer system 100. The computer system 100 maintains a data map for a visitor-state 210 and a data map for a super-visitor-state 220. The visitor-state 210 stores only feature-vectors of the visitor-ID. For example, as illustrated, the key for the visitor-state 210 is the visitor-ID, while the associated value are the features, e.g., stored as feature name and value. The super-visitor-state 220 stores feature-vectors of both the visitor-ID and the super-visitor-ID. For example, as illustrated, the key for the super-visitor-state 220 may be the visitor-ID as well as the super-visitor-ID, while the associated value are the features, e.g., stored as feature name and value. The super-visitor-state 220, for example, may store information at a visitor-ID level until a super-visitor-ID is available, and may store information at a super-visitor-ID level after the corresponding super-visitor-ID is available. When the super-visitor-ID is available for a visitor-ID, and after aggregating features associated with the visitor-ID with the features associated with the super-visitor-ID, the entry corresponding to the visitor-ID may be removed from super-visitor-state. Accordingly, aggregation of features from all visits is possible, even before a super-visitor-ID was available from the identity resolution algorithm.

Figure 3:
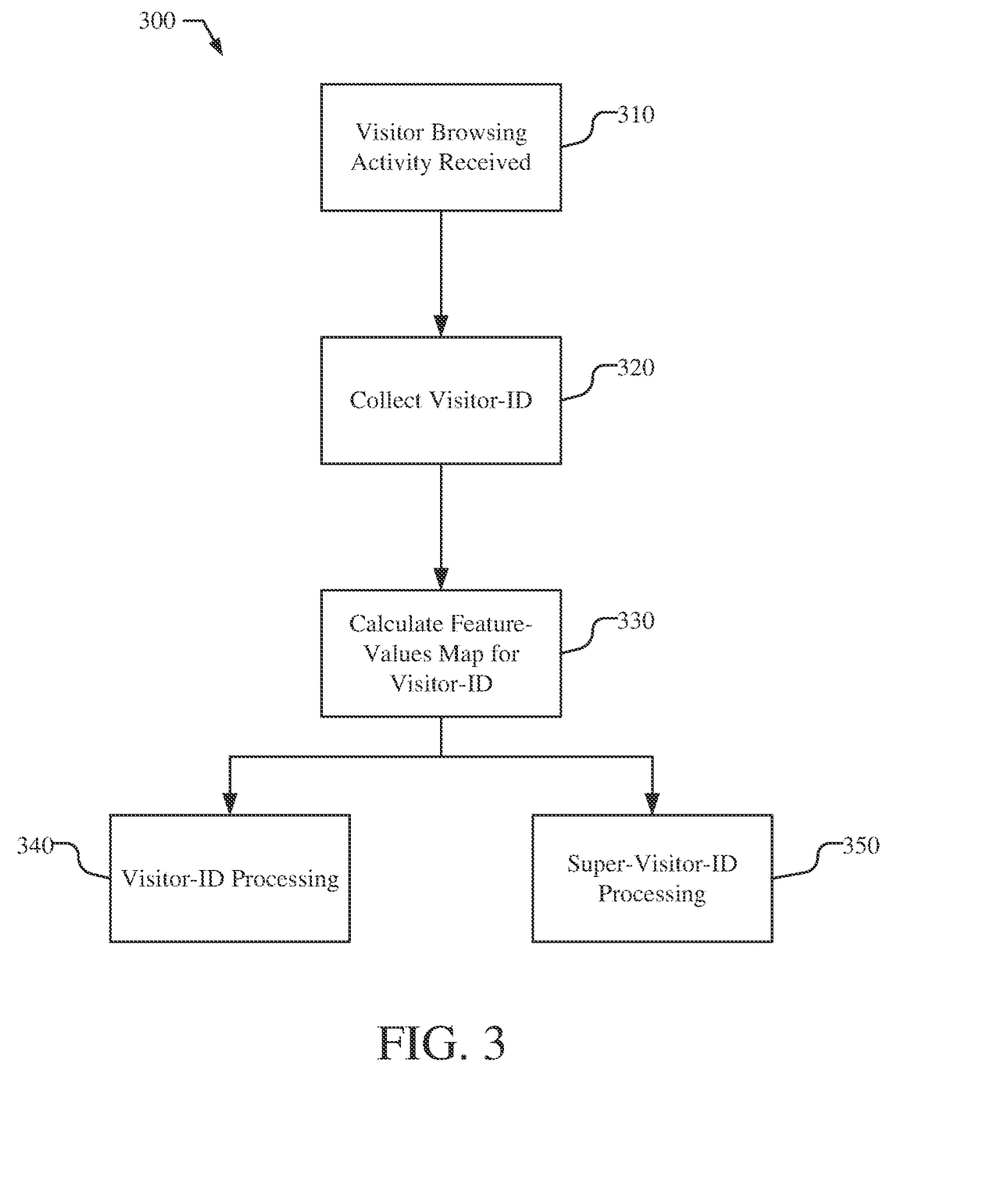
FIG. 3 shows an illustrative flow chart depicting an example operation of an anonymous visitor feature pipeline in a computer system for tracking anonymous visitors.

FIG. 3 shows an illustrative flow chart depicting an example operation 300 of an anonymous visitor feature pipeline, such as anonymous visitor feature pipeline 150 shown in FIG. 1. Operation 300, for example, is performed in response to a visitor anonymously accessing an online website or mobile app via the visitor's computer systems. The visitor, for example, may access the online website or mobile app without logging in or otherwise performing authentication and, accordingly, the identity of the visitor is unknown, i.e., the visitor is anonymous. The anonymous visitor may access the online website or mobile app that is hosted by computer system 100 or may be hosted by a separate server to which computer system 100 is coupled and accesses via interface 110. It should be understood that anonymous visitors to the online website or mobile app may include different individuals (e.g., customers), but may also include the same individuals accessing the online website or mobile app at different times using the same or different computer systems, e.g., personal laptop, a mobile phone, a tablet, a work computer, etc.

As illustrated at block 310, the browsing activity of the anonymous visitor is received. The browsing activity of the anonymous visitor is obtained, e.g., via interface 110. The browsing activity, for example, may include the pages-viewed (including pages that contain help articles, product descriptions, etc.), icons-clicked, time spent, and any other relevant information. The browsing activity of the anonymous visitor is processed and converted into visitor-level features that indicate the visitor's engagement with the online website or mobile app. For example, the features identified based on the browsing activity may include clickstream data which may be converted into numerical and/or categorical features, which may have a feature name and value.

At block 320, an anonymous user identifier, i.e., visitor-ID, that is associated with the browsing activity is collected. For example, the visitor-ID may be assigned to each anonymous visitor when each visitor first visits the website or mobile app from a particular device. The visitor-ID, for example, may be a universally unique identifier (UUID). In some implementations, the visitor-ID may be numeric or alphanumeric string that is assigned to each of the anonymous visitor, for example, based on the MAC (Media Access Control) address of the computer system used by the anonymous visitor to access the website or mobile app. If the anonymous visitor has previously accessed the website or app using the same computer device, the previously assigned visitor-ID is obtained. Additionally, if a super-visitor-ID has been previously assigned to the anonymous visitor accessing the website or app using the same computer device, the super-visitor-ID may be obtained, e.g., using the identity resolution module 180.

At block 330, a feature-values map is generated for the visitor-ID based on the features obtained at block 310 and the visitor-ID collected at block 320. For example, features associated with the visitor-ID may be stored as a dictionary that maps from the visitor-ID to the feature name and values.

The operations illustrated in blocks 310, 320, and 330 performed by, e.g., the anonymous visitor feature pipeline 150, provides a real-time clickstream processing pipeline for real-time computation of features from the browsing activity associated with anonymous visitors. The operation 300 then flows to both the visitor-ID processing block 340 discussed in reference to FIG. 4 and the super-visitor-ID processing block 350 discussed in reference to FIGS. 5A and 5B.

Figure 4:
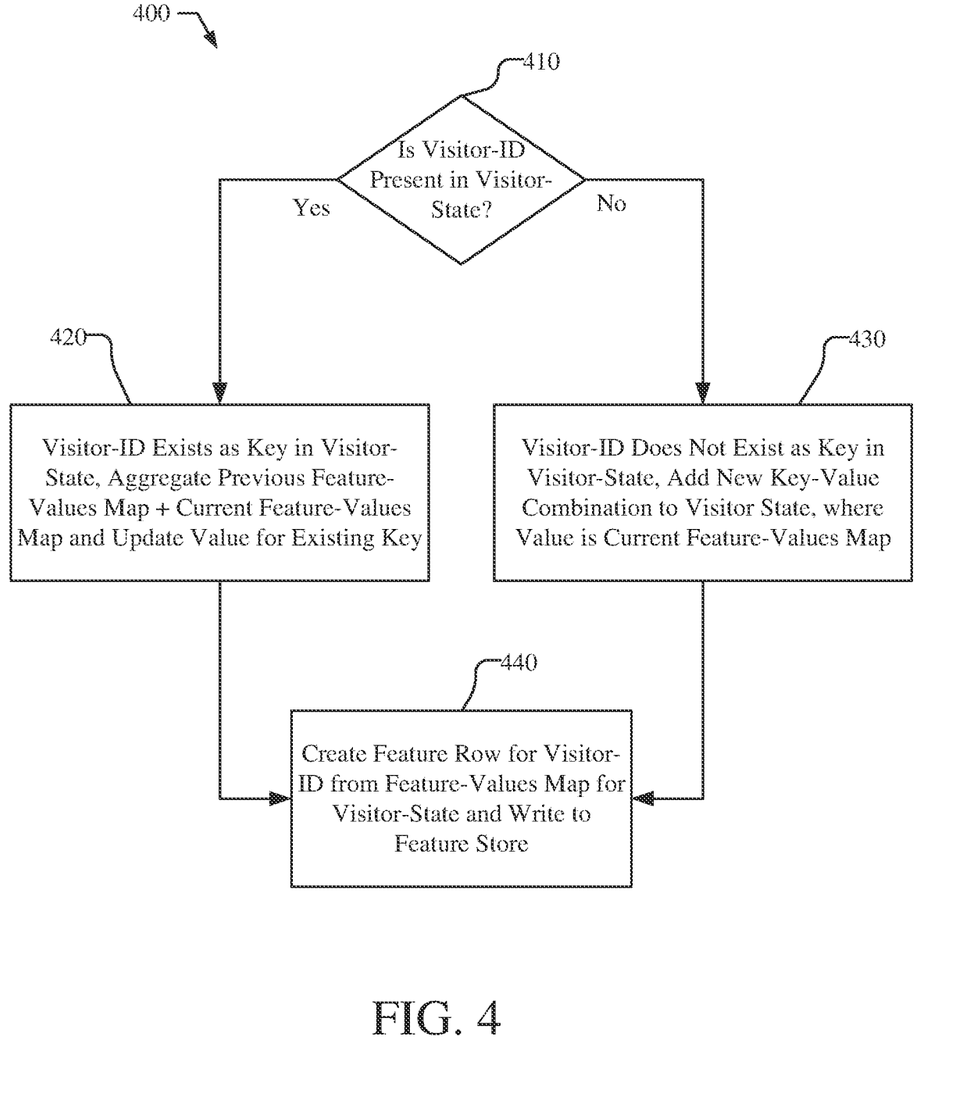
FIG. 4 shows an illustrative flow chart depicting an example operation of visitor-identifier (ID) processing in a computer system for tracking anonymous visitors.

FIG. 4 shows an illustrative flow chart depicting an example operation 400 of visitor-ID processing, such as referred to in block 340 of FIG. 3, and which may be performed by the visitor-ID processing module 160 shown in FIG. 1.

At block 410, the process determines whether the visitor-ID, e.g., collected from block 320 in FIG. 3, is present in the visitor-state. By way of example, an anonymous visitor may have previously accessed the website or app and may have been assigned a visitor-ID that is stored in the feature store (e.g., database 120 in FIG. 1) with associated features in the visitor-state (e.g., visitor-state 210 in FIG. 2). If the visitor-ID has been previously added to the visitor-state, then the process proceeds to block 420 to update the features associated with the visitor-ID in the visitor-state. On the other hand, an anonymous visitor may not have previously accessed the website or app or the anonymous visitor may not have been assigned a visitor-ID that is stored in the feature store (e.g., database 120 in FIG. 1) with associated features in the visitor-state (e.g., visitor-state 210 in FIG. 2). If the visitor-ID has not been previously added to the visitor-state, then the process proceeds to block 430 to add the visitor-ID and associated features to the visitor-state.

At block 420, the visitor-ID already exists as a key in the visitor-state and the newly acquired features associated with the visitor-ID are aggregated with previously acquired features. For example, the current feature-values map for the visitor-ID generated at block 330 in FIG. 3, are aggregated with previous feature-values map for the visitor-ID and the updated values are added for the existing key (visitor-ID) in the visitor-state. The features, for example, may be aggregated using multiple aggregation mechanisms, such as summation, most recent value, maximum/minimum possible value, etc. For example, a feature that captures the number of views on a certain page may be aggregated using summation, whereas a feature that captures the oldest or most-recent date of activity may be aggregated using maximum/minimum computation.

At block 430, the visitor-ID does not exist as a key in the visitor-state and accordingly, a new key-value is added to the visitor-state, e.g., the visitor-ID and associated features are added to the visitor-state 210 shown in FIG. 2. For example, the current feature-values map for the visitor-ID generated at block 330 in FIG. 3 is added for the new key (visitor-ID) in the visitor-state.

At block 440, the features associated with the visitor-ID from the feature-values map from block 420 or block 430, are written, e.g., stored, in the feature store (e.g., database 120 in FIG. 1) for the visitor-state. By continuously acquiring, aggregating, and storing features associated with the visitor-ID in the visitor-state, the changing profile of each anonymous visitor may be continuously tracked and used, e.g., with a trained ML model, to make more personalized predictions, e.g., for recommendations and experiences that are provided to the anonymous visitor via the online website or app, before a super-visitor-identifier is available from the identity resolution algorithm, e.g., from the identity resolution module 180 shown in FIG. 1. In some implementations, features associated with the visitor-ID may be continuously acquired, aggregated, and stored at the visitor-ID in the visitor-state, even after a super-visitor-ID is assigned (i.e., the features may be tracked in the visitor-state and super-visitor-state in parallel, so that training and predictions may be made at both the visitor-level and super-visitor level.

Figure 5A:
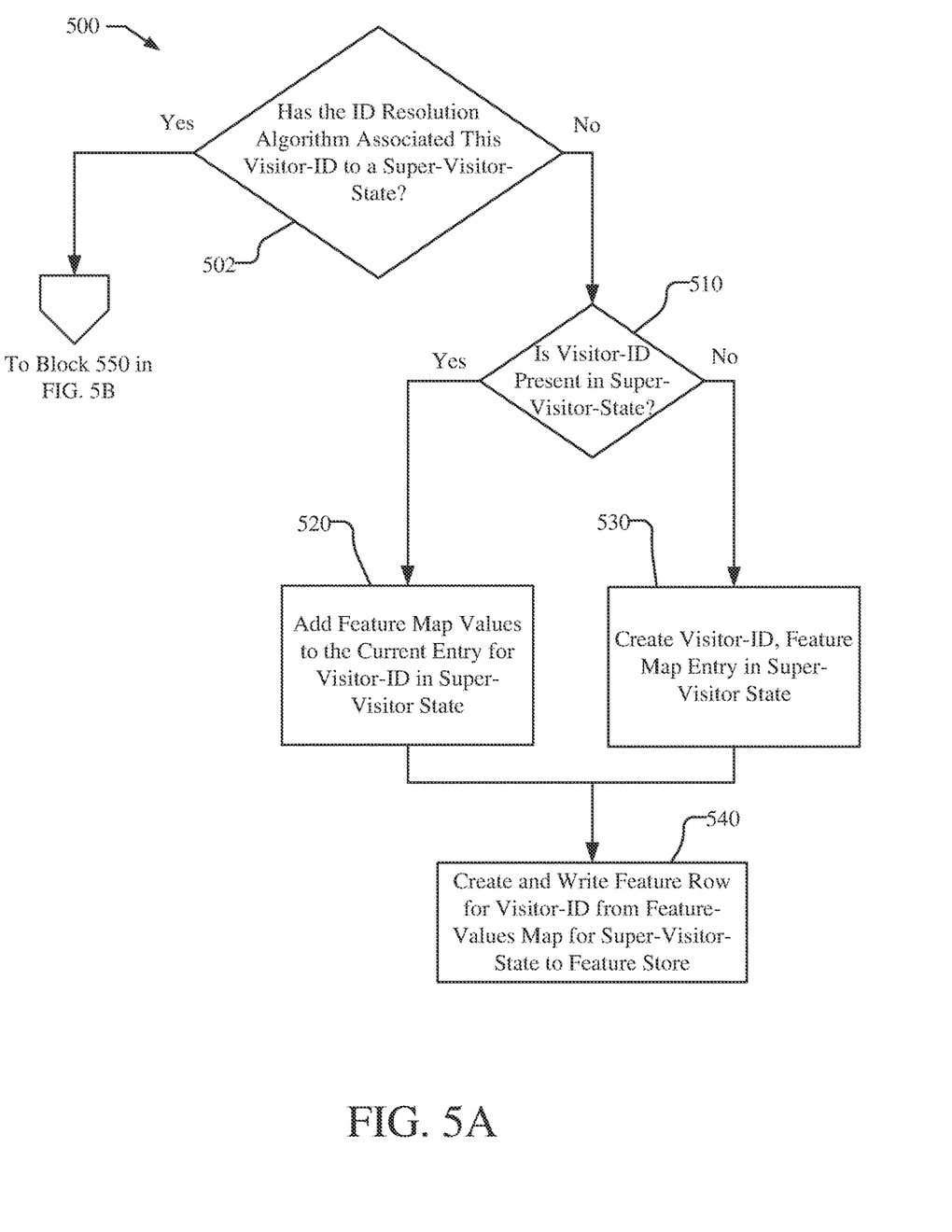
FIGS. 5A and 5B show an illustrative flow chart depicting an example operation of super-visitor-ID processing in a computer system for tracking anonymous visitors.
Figure 5B:
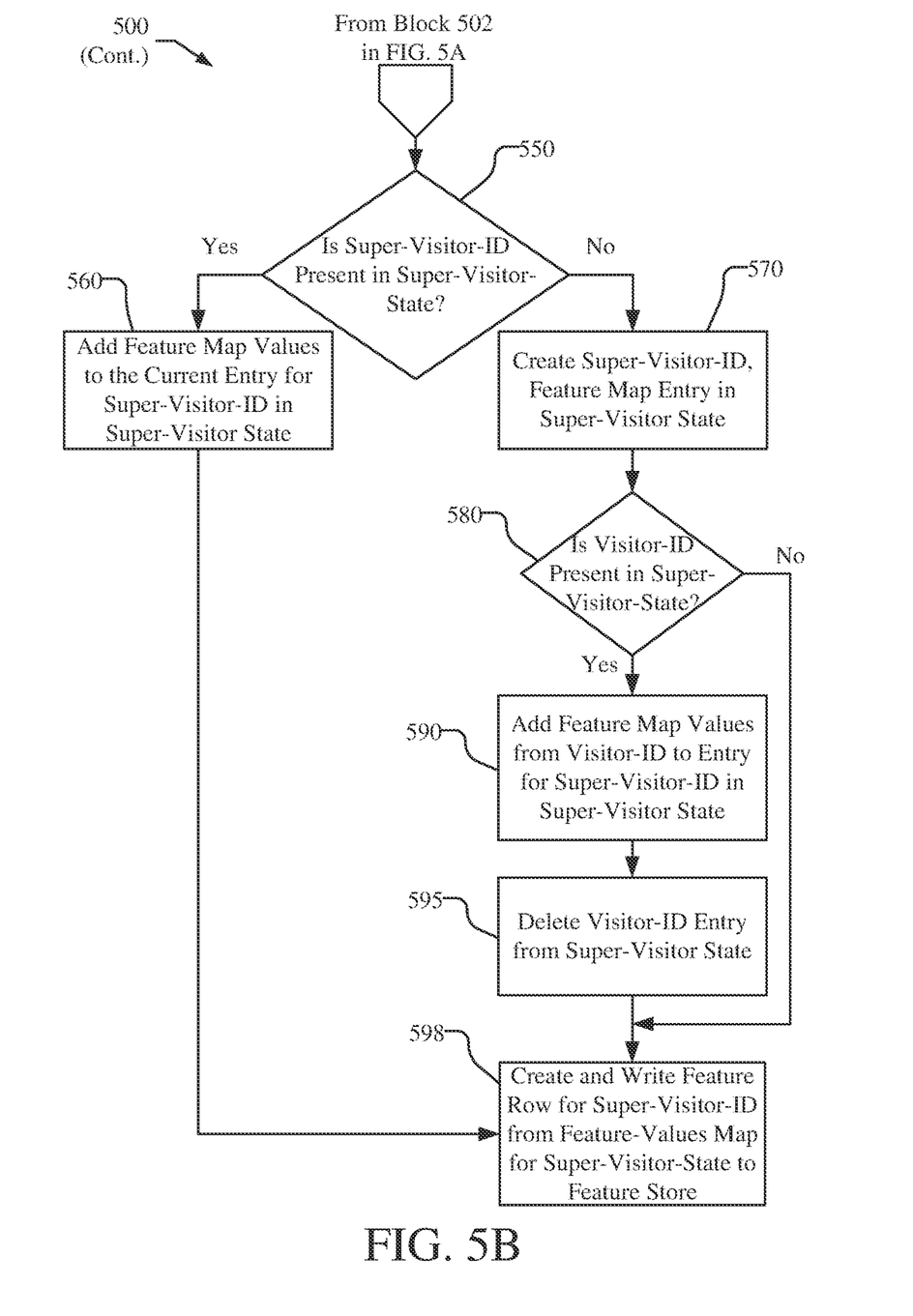

FIGS. 5A and 5B show an illustrative flow chart depicting an example operation 500 of super-visitor-ID processing, such as referred to in block 350 of FIG. 3, and which may be performed by the super-visitor-ID processing module 170 shown in FIG. 1.

At block 502, the process determines whether the identity resolution algorithm, e.g., performed by the identity resolution module 180 shown in FIG. 1, has associated the visitor-ID to a super-visitor-state. If the identity resolution algorithm has not associated the visitor-ID to a super-visitor-state, the operation 500 proceeds to block 510 as illustrated in FIG. 5A, and if the has associated the visitor-ID to a super-visitor-state, the operation 500 proceeds to block 550 as illustrated in FIG. 5B. By way of example, the identity resolution algorithm may not have associated the visitor-ID to a super-visitor-state if the anonymous visitor has not previously accessed the website or app and has not been assigned a visitor-ID. In another example, if the identity resolution algorithm runs periodically, e.g., at a predetermined frequency such as once a day, once an hour, etc., the identity resolution algorithm may not have associated the visitor-ID to a super-visitor-state if the identity resolution algorithm has not yet run, even if the anonymous visitor has previously accessed the website or app one or more times and has an assigned visitor-ID.

At block 510, when the identity resolution algorithm has not associated the visitor-ID to a super-visitor-state as determined at block 502, the process determines whether the visitor-ID, e.g., collected from block 320 in FIG. 3, is present in the super-visitor-state. By way of example, an anonymous visitor may have previously accessed the website or app and may have been assigned a visitor-ID that is stored in the feature store (e.g., database 120 in FIG. 1) with associated features in the super-visitor-state (e.g., super-visitor-state 220 in FIG. 2). If the visitor-ID has been previously added to the super-visitor-state, then the process proceeds to block 520 to update the set of features associated with the visitor-ID in the super-visitor-state. On the other hand, an anonymous visitor may not have previously accessed the website or app or the anonymous visitor may not have been assigned a visitor-ID that is stored in the feature store (e.g., database 120 in FIG. 1) with associated features in the super-visitor-state (e.g., super-visitor-state 220 in FIG. 2). If the visitor-ID has not been previously added to the super-visitor-state, then the process proceeds to block 530 to add the visitor-ID and associated features to the super-visitor-state.

At block 520, the visitor-ID already exists as a key in the super-visitor-state and the newly acquired features associated with the visitor-ID are aggregated with the set of previously acquired features associated with the visitor-ID stored in the super-visitor-state. For example, the current feature-values map for the visitor-ID generated at block 330 in FIG. 3, are aggregated with previous feature-values map for the visitor-ID in the super-visitor-state and the updated values is added for the existing key (visitor-ID) in the super-visitor-state. The features, for example, may be aggregated using multiple aggregation mechanisms, such as summation, most recent value, maximum/minimum possible value, etc. For example, a feature that captures the number of views on a certain page may be aggregated using summation, whereas a feature that captures the oldest or most-recent date of activity may be aggregated using maximum/minimum computation.

At block 530, the visitor-ID does not exist as a key in the super-visitor-state and accordingly, a new key-value is added to the super-visitor-state, e.g., the visitor-ID and associated features is added to the super-visitor-state 220 shown in FIG. 2. For example, the current feature-values map for the visitor-ID generated at block 330 in FIG. 3 is added for the new key (visitor-ID) in the super-visitor-state.

At block 540, the features associated with the visitor-ID from the feature-values map from block 520 or block 530, are written, e.g., stored, in the feature store (e.g., database 120 in FIG. 1) for the super-visitor-state. By way of example, a feature row is created and written to the feature store for the visitor-ID from the feature-values map in the super-visitor-state. By continuously acquiring, aggregating, and storing features associated with the visitor-ID in the super-visitor-state, the features associated with the visitor-ID prior to running the identity resolution algorithm are not lost due to the delayed availability of a super-visitor-ID.

At block 550 in FIG. 5B, when the identity resolution algorithm has associated the visitor-ID to a super-visitor-state as determined at block 502 in FIG. 5A, the process determines whether the super-visitor-ID is present in the super-visitor-state. By way of example, the super-visitor-ID may have been added previously to the super-visitor-state (e.g., super-visitor-state 220 in FIG. 2) and stored in the feature store (e.g., database 120 in FIG. 1) after the identity resolution algorithm has run and associated the visitor-ID with the super-visitor-ID. If the super-visitor-ID has previously been added to the super-visitor-state, then the process proceeds to block 560 to update the set of features associated with the super-visitor-ID in the super-visitor-state. On the other hand, the visitor-ID may be associated with a super-visitor-ID by the identity resolution algorithm, but the super-visitor-ID may not have been added yet to the super-visitor-state (e.g., super-visitor-state 220 in FIG. 2) stored in the feature store (e.g., database 120 in FIG. 1). If the super-visitor-ID has not been previously added to the super-visitor-state, e.g., then the process proceeds to block 570 to add the super-visitor-ID and associated features to the super-visitor-state.

At block 560, the super-visitor-ID already exists as a key in the super-visitor-state and the newly acquired features are aggregated with the set of previously acquired features associated with the super-visitor-ID stored in the super-visitor-state. For example, the current feature-values map for the visitor-ID generated at block 330 in FIG. 3, are aggregated with the feature-values map for the super-visitor-ID in the super-visitor-state and the updated values is added for the existing key (super-visitor-ID) in the super-visitor-state. The features, for example, may be aggregated using multiple aggregation mechanisms, such as summation, most recent value, maximum/minimum possible value, etc. For example, a feature that captures the number of views on a certain page may be aggregated using summation, whereas a feature that captures the oldest or most-recent date of activity may be aggregated using maximum/minimum computation. Once newly acquired features are aggregated with the set of previously acquired features associated with the super-visitor-ID stored in the super-visitor-state in block 560 is complete, the process proceeds to block 598 where the features associated with the super-visitor-ID, are written, e.g., stored, in the feature store (e.g., database 120 in FIG. 1) for the super-visitor-state.

At block 570, the super-visitor-ID does not exist as a key in the super-visitor-state and accordingly, a new key-value is added to the super-visitor-state, e.g., the super-visitor-ID and associated features are added to the super-visitor-state 220 shown in FIG. 2. For example, the current feature-values map for the visitor-ID generated at block 330 in FIG. 3 is added for the new key (super-visitor-ID) in the super-visitor-state.

At block 580 in FIG. 5B, the process determines whether the visitor-ID is still present in the super-visitor-state. The visitor-ID may still be present in the super-visitor-state if it has not been previously deleted from the super-visitor-state, as discussed below. By way of example, the visitor-ID still be present in the super-visitor-state if the ID resolution algorithm has not previously associated the visitor-ID to a super-visitor-state (as determined in block 502 of FIG. 5A). If the visitor-ID is present in the super-visitor-state, the process proceeds to blocks 590 and 595 to update the set of features associated with the super-visitor-ID with the set of features associated with the visitor-ID and to delete the visitor-ID entry from the super-visitor-state. On the other hand, the super-visitor-ID may have already been removed from the super-visitor-state if the ID resolution algorithm has previously associated the visitor-ID to a super-visitor-state (as determined in block 502 of FIG. 5A). If the visitor-ID is not present in the super-visitor-state then the process proceeds to directly to block 598 where the features associated with the super-visitor-ID from block 570, are written, e.g., stored, in the feature store (e.g., database 120 in FIG. 1) for the super-visitor-state.

At block 590, the visitor-ID still exists as a key in the super-visitor-state and the features associated with the visitor-ID in the super-visitor-state are aggregated with the features associated with the super-visitor-ID. For example, the feature map values from the visitor-ID in the super-visitor-state are aggregated with the current entry of features for the super-visitor-ID generated in block 570. The features, for example, may be aggregated using multiple aggregation mechanisms, such as summation, most recent value, maximum/minimum possible value, etc. For example, a feature that captures the number of views on a certain page may be aggregated using summation, whereas a feature that captures the oldest or most-recent date of activity may be aggregated using maximum/minimum computation.

At block 595, the visitor-ID entry in the super-visitor-state may be deleted.

At block 598, the features associated with the super-visitor-ID from the feature-values map from block 560 or block 570 or block 590, are written, e.g., stored, in the feature store (e.g., database 120 in FIG. 1) for the super-visitor-state. For example, a feature row is created and written to the feature store for the super-visitor-ID from the feature-values map for the super-visitor-state. By continuously acquiring, aggregating, and storing features associated with the super-visitor-ID in the super-visitor-state, the changing profile of each anonymous visitor may be continuously tracked and used, e.g., with a trained ML model, to make more personalized predictions, e.g., for recommendations and experiences that are provided to the anonymous visitor via the online website or app, after the super-visitor-identifier is available from the identity resolution algorithm, e.g., from the identity resolution module 180 shown in FIG. 1. Additionally, by aggregating previously acquired features for the visitor-ID and subsequently deleting the visitor-ID entry from the super-visitor-state, the features that are associated with the visitor-ID prior to running the identity resolution algorithm are not lost due to the delayed availability of a super-visitor-ID and double counting of features is avoided.

Figure 6:
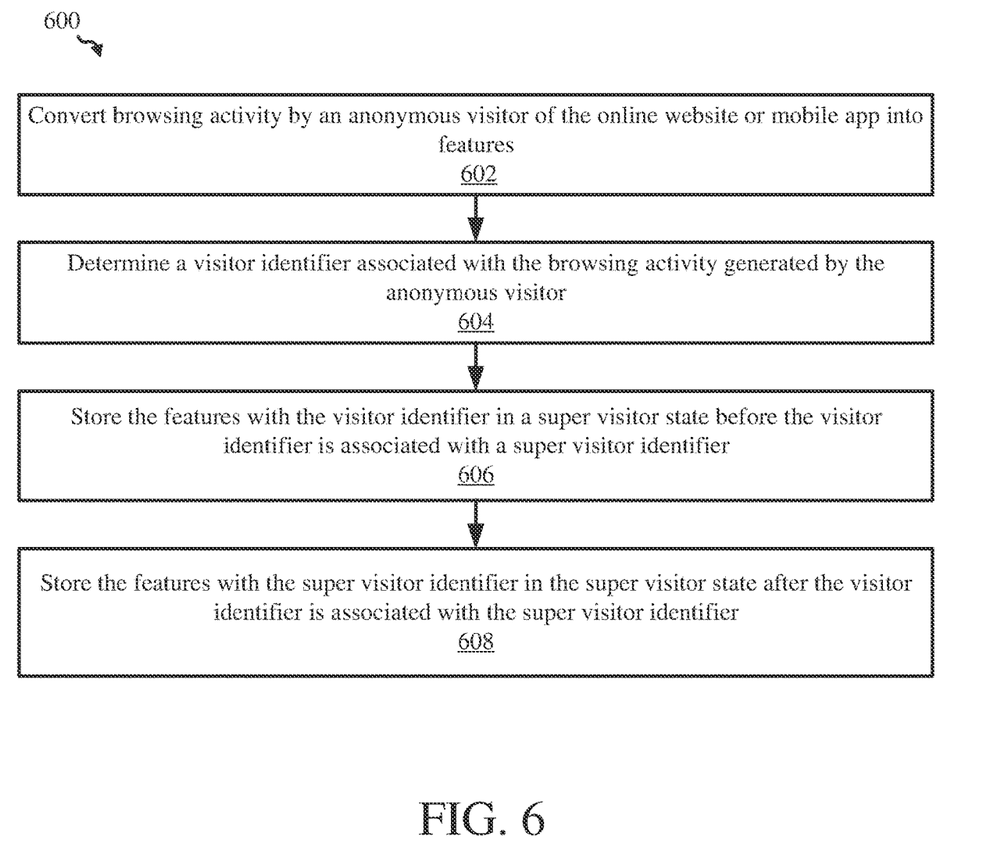
FIG. 6 shows an illustrative flow chart depicting a computer-implemented method for tracking anonymous visitors of an online website or mobile app, according to some implementations.

FIG. 6 shows an illustrative flow chart depicting a computer-implemented method 600 for tracking anonymous visitors of an online website or mobile app, according to some implementations. The method 600, for example, may perform one or more aspects of operations 300 shown in FIG. 3, operation 400 shown in FIG. 4, and operation 500 shown in FIGS. 5A and 5B, and may be performed by the computer system 100 shown in FIG. 1, using the visitor-state 210 and super-visitor-state 220 shown in FIG. 2.

At block 602, the computer system may convert browsing activity by an anonymous visitor of the online website or mobile app into features, e.g., as described in reference to anonymous visitor feature pipeline 150 in FIG. 1 and blocks 310 and 330 of FIG. 3. For example, the computer system may monitor browsing activity associated with each anonymous user to obtain clickstream data, which is converted into the features associated with each anonymous user identifier. The features, for example, may include at least one of pages viewed, icons clicked, and time spent on a page of the online website.

At block 604, the computer system may determine a visitor-identifier associated with the browsing activity generated by the anonymous visitor, e.g., as described in reference to anonymous visitor feature pipeline 150 in FIG. 1 and block 320 of FIG. 3. The anonymous users of the online website, for example, may be users who have not been identified by the online website, e.g., via a log in or an authentication process.

At block 606, the computer system may store the features with the visitor-identifier in a super-visitor-state before the visitor-identifier is associated with a super-visitor-identifier, e.g., as described in reference to the super-visitor-ID processing module 170 in FIG. 1, the super-visitor-state 220 in FIG. 2, and blocks 502, 520 and 530 in FIG. 5A.

At block 608, the computer system may store the features with the super-visitor-identifier in the super-visitor-state after the visitor-identifier is associated with the super-visitor-identifier, e.g., as described in reference to the super-visitor-ID processing module 170 in FIG. 1, the super-visitor-state 220 in FIG. 2, block 502 in FIG. 5A, and blocks 560 and 570 in FIG. 5B.

In some implementation, the features may be stored with the visitor-identifier in a feature store and the features are stored with the super-visitor-identifier in the feature store, e.g., as described in reference to the database 120 and the super-visitor-ID processing module 170 in FIG. 1, the super-visitor-state 220 in FIG. 2, blocks 520 and 530 in FIG. 5A, and blocks 560 and 570 in FIG. 5B.

In some implementation, after the visitor-identifier is associated with the super-visitor-identifier and the visitor-identifier is present in the super-visitor-state, the computer system may combine features associated with the visitor-identifier in the super-visitor-state to a set of features associated with the super-visitor-identifier in the super-visitor-state, e.g., as described in reference to the super-visitor-ID processing module 170 in FIG. 1, the super-visitor-state 220 in FIG. 2, block 502 in FIG. 5A, and blocks 580 and 590 in FIG. 5B. The computer system may further delete the visitor-identifier from the super-visitor-state, e.g., as described in reference to the super-visitor-ID processing module 170 in FIG. 1, the super-visitor-state 220 in FIG. 2, and block 595 in FIG. 5B. By way of example, the features associated with the visitor-identifier in the super-visitor-state may be combined with the set of features associated with the super-visitor-identifier in the super-visitor-state by aggregating features associated with the visitor-identifier with the set of features associated with the super-visitor-identifier. Aggregating, for example, may include at least one of summation, most recent value, maximum possible value, and minimum possible value.

In some implementations, the computer system may store the features with the visitor-identifier in the super-visitor-state before the visitor-identifier is associated with the super-visitor-identifier by creating an entry with the visitor-identifier in the super-visitor-state and storing the features with the visitor-identifier if the visitor-identifier is not present in the super-visitor-state, e.g., as described in reference to the super-visitor-ID processing module 170 in FIG. 1, the super-visitor-state 220 in FIG. 2, and block 510 and 530 in FIG. 5A, and combining the features with a set of features associated with the visitor-identifier in the super-visitor-state if the visitor-identifier is present in the super-visitor-state, e.g., as described in reference to the super-visitor-ID processing module 170 in FIG. 1, the super-visitor-state 220 in FIG. 2, and block 510 and 520 in FIG. 5A.

In some implementations, the computer system may store the features with the super-visitor-identifier in the super-visitor-state after the visitor-identifier associated with the super-visitor-identifier by creating an entry with the super-visitor-identifier in the super-visitor-state and storing the features with the super-visitor-identifier if the super-visitor-identifier is not present in the super-visitor-state, e.g., as described in reference to the super-visitor-ID processing module 170 in FIG. 1, the super-visitor-state 220 in FIG. 2, and blocks 550 and 570 in FIG. 5B, and combining the features with a set of features associated with the super-visitor-identifier in the super-visitor-state if the super-visitor-identifier is present in the super-visitor-state, e.g., as described in reference to the super-visitor-ID processing module 170 in FIG. 1, the super-visitor-state 220 in FIG. 2, and blocks 550 and 560 in FIG. 5B.

In some implementations, the computer system may further store the features with the visitor-identifier in a visitor-state, e.g., as described in reference to the visitor-ID processing module 160 in FIG. 1, the visitor-state 210 in FIG. 2, and blocks 420 and 430 in FIG. 4. For example, the computer system may store the features with the visitor-identifier in the visitor-state by creating an entry with the visitor-identifier in the visitor-state and storing the features with the visitor-identifier in the visitor-state if the visitor-identifier is not present in the visitor-state, e.g., as described in reference to the visitor-ID processing module 160 in FIG. 1, the visitor-state 210 in FIG. 2, and blocks 410 and 430 in FIG. 4, and combining the features with a set of features associated with the visitor-identifier in the visitor-state if the visitor-identifier is present in the visitor-state, e.g., as described in reference to the visitor-ID processing module 160 in FIG. 1, the visitor-state 210 in FIG. 2, and blocks 410 and 420 in FIG. 4.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for tracking anonymous visitors of an online website or mobile app, comprising:

converting browsing activity by an anonymous visitor of the online website or mobile app into features;

determining a visitor-identifier associated with the browsing activity generated by the anonymous visitor, wherein different visitor-identifiers are used to identify a same anonymous visitor accessing the online website or mobile app via different devices;

storing the features with the visitor-identifier in a super-visitor-state before the visitor-identifier is associated with a super-visitor-identifier, wherein a same super-visitor-identifier is used to associate multiple visitor-identifiers for the same anonymous visitor; and storing the features with the super-visitor-identifier in the super-visitor-state after the visitor-identifier is associated with the super-visitor-identifier.

2. The computer-implemented method of claim 1, wherein the features are stored with the visitor-identifier in a feature store and the features are stored with the super-visitor-identifier in the feature store.

3. The computer-implemented method of claim 1, wherein after the visitor-identifier is associated with the super-visitor-identifier and the visitor-identifier is present in the super-visitor-state, the computer-implemented method further comprising:
combining features associated with the visitor-identifier in the super-visitor-state with a set of features associated with the super-visitor-identifier in the super-visitor-state; and
deleting the visitor-identifier from the super-visitor-state.

4. The computer-implemented method of claim 3, wherein combining the features associated with the visitor-identifier in the super-visitor-state with the set of features associated with the super-visitor-identifier in the super-visitor-state comprises aggregating features associated with the visitor-identifier with the set of features associated with the super-visitor-identifier, wherein aggregating feature values comprises at least one of summation, most recent value, maximum possible value, and minimum possible value.

5. The computer-implemented method of claim 1, wherein storing the features with the visitor-identifier in the super-visitor-state before the visitor-identifier is associated with the super-visitor-identifier comprises:
creating an entry with the visitor-identifier in the super-visitor-state and storing the features with the visitor-identifier if the visitor-identifier is not present in the super-visitor-state; and
combining the features with a set of features associated with the visitor-identifier in the super-visitor-state if the visitor-identifier is present in the super-visitor-state.

6. The computer-implemented method of claim 1, wherein storing the features with the super-visitor-identifier in the super-visitor-state after the visitor-identifier associated with the super-visitor-identifier comprises:
creating an entry with the super-visitor-identifier in the super-visitor-state and storing the features with the super-visitor-identifier if the super-visitor-identifier is not present in the super-visitor-state; and
combining the features with a set of features associated with the super-visitor-identifier in the super-visitor-state if the super-visitor-identifier is present in the super-visitor-state.

7. The computer-implemented method of claim 1, further comprising storing the features with the visitor-identifier in a visitor-state.

8. The computer-implemented method of claim 7, wherein storing the features with the visitor-identifier in the visitor-state comprises:
creating an entry with the visitor-identifier in the visitor-state and storing the features with the visitor-identifier in the visitor-state if the visitor-identifier is not present in the visitor-state; and
combining the features with a set of features associated with the visitor-identifier in the visitor-state if the visitor-identifier is present in the visitor-state.

9. The computer-implemented method of claim 1, wherein the features comprise feature values associated with at least one of pages viewed, icons clicked, and time spent on a page of the online website.

10. A system for tracking anonymous visitors of an online website or mobile app, comprising:
one or more processors; and
a memory storing instructions that, when executed by the one or more processors, causes the system to perform operations comprising:
converting browsing activity by an anonymous visitor of the online website or mobile app into features;
determining a visitor-identifier associated with the browsing activity generated by the anonymous visitor, wherein different visitor-identifiers are used to identify a same anonymous visitor accessing the online website or mobile app via different devices;
storing the features with the visitor-identifier in a super-visitor-state before the visitor-identifier is associated with a super-visitor-identifier, wherein a same super-visitor-identifier is used to associate multiple visitor-identifiers for the same anonymous visitor; and
storing the features with the super-visitor-identifier in the super-visitor-state after the visitor-identifier is associated with the super-visitor-identifier.

11. The system of claim 10, wherein the features are stored with the visitor-identifier in a feature store and the features are stored with the super-visitor-identifier in the feature store.

12. The system of claim 10, wherein after the visitor-identifier is associated with the super-visitor-identifier and the visitor-identifier is present in the super-visitor-state, the system is caused to perform operations comprising:
combining features associated with the visitor-identifier in the super-visitor-state with a set of features associated with the super-visitor-identifier in the super-visitor-state; and
deleting the visitor-identifier from the super-visitor-state.

13. The system of claim 12, wherein the system is caused to perform the operation of combining the features associated with the visitor-identifier in the super-visitor-state with the set of features associated with the super-visitor-identifier in the super-visitor-state by aggregating features associated with the visitor-identifier with the set of features associated with the super-visitor-identifier, wherein aggregating feature values comprises at least one of summation, most recent value, maximum possible value, and minimum possible value.

14. The system of claim 10, wherein the system is caused to perform the operation of storing the features with the visitor-identifier in the super-visitor-state before the visitor-identifier is associated with the super-visitor-identifier by being caused to perform operations comprising:
creating an entry with the visitor-identifier in the super-visitor-state and storing the features with the visitor-identifier if the visitor-identifier is not present in the super-visitor-state; and
combining the features with a set of features associated with the visitor-identifier in the super-visitor-state if the visitor-identifier is present in the super-visitor-state.

15. The system of claim 10, wherein the system is caused to perform the operation of storing the features with the super-visitor-identifier in the super-visitor-state after the visitor-identifier associated with the super-visitor-identifier by being caused to perform operations comprising:
creating an entry with the super-visitor-identifier in the super-visitor-state and storing the features with the super-visitor-identifier if the super-visitor-identifier is not present in the super-visitor-state; and combining the features with a set of features associated with the super-visitor-identifier in the super-visitor-state if the super-visitor-identifier is present in the super-visitor-state.

16. The system of claim 10, wherein the system is further caused to perform the operation comprising storing the features with the visitor-identifier in a visitor-state.

17. The system of claim 16, wherein the system is caused to perform the operation of storing the features with the visitor-identifier in the visitor-state by being caused to perform operations comprising:
creating an entry with the visitor-identifier in the visitor-state and storing the features with the visitor-identifier in the visitor-state if the visitor-identifier is not present in the visitor-state; and
combining the features with a set of features associated with the visitor-identifier in the visitor-state if the visitor-identifier is present in the visitor-state.

18. The system of claim 10, wherein the features comprise feature values associated with at least one of pages viewed, icons clicked, and time spent on a page of the online website.

* * * * *